April 30, 1957 R. F. McVICKER ET AL 2,790,531
WRAPPING MACHINE FEEDER
Filed June 29, 1953 4 Sheets-Sheet 4
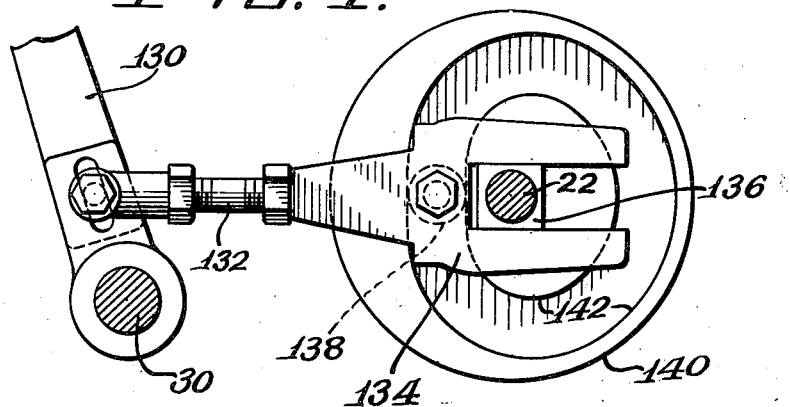
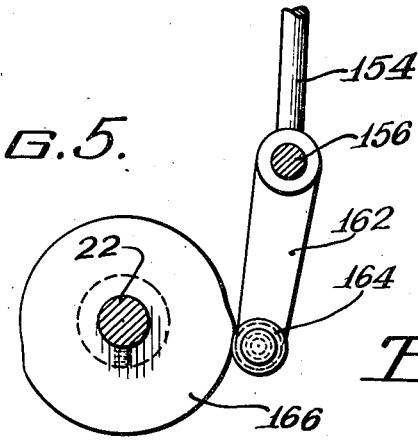
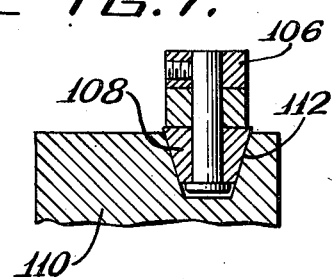
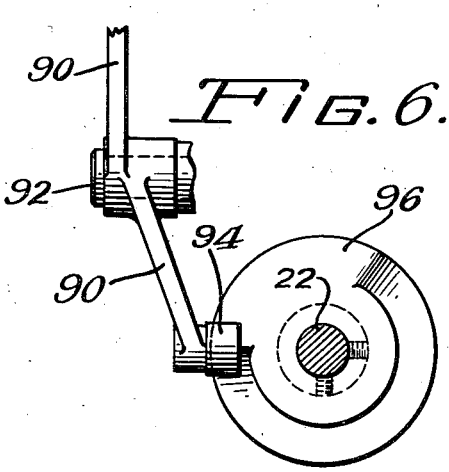
INVENTORS:
Robert F. McVicker
BY Robert E. Taggart
Bair, Freeman & Molinare
Attys.

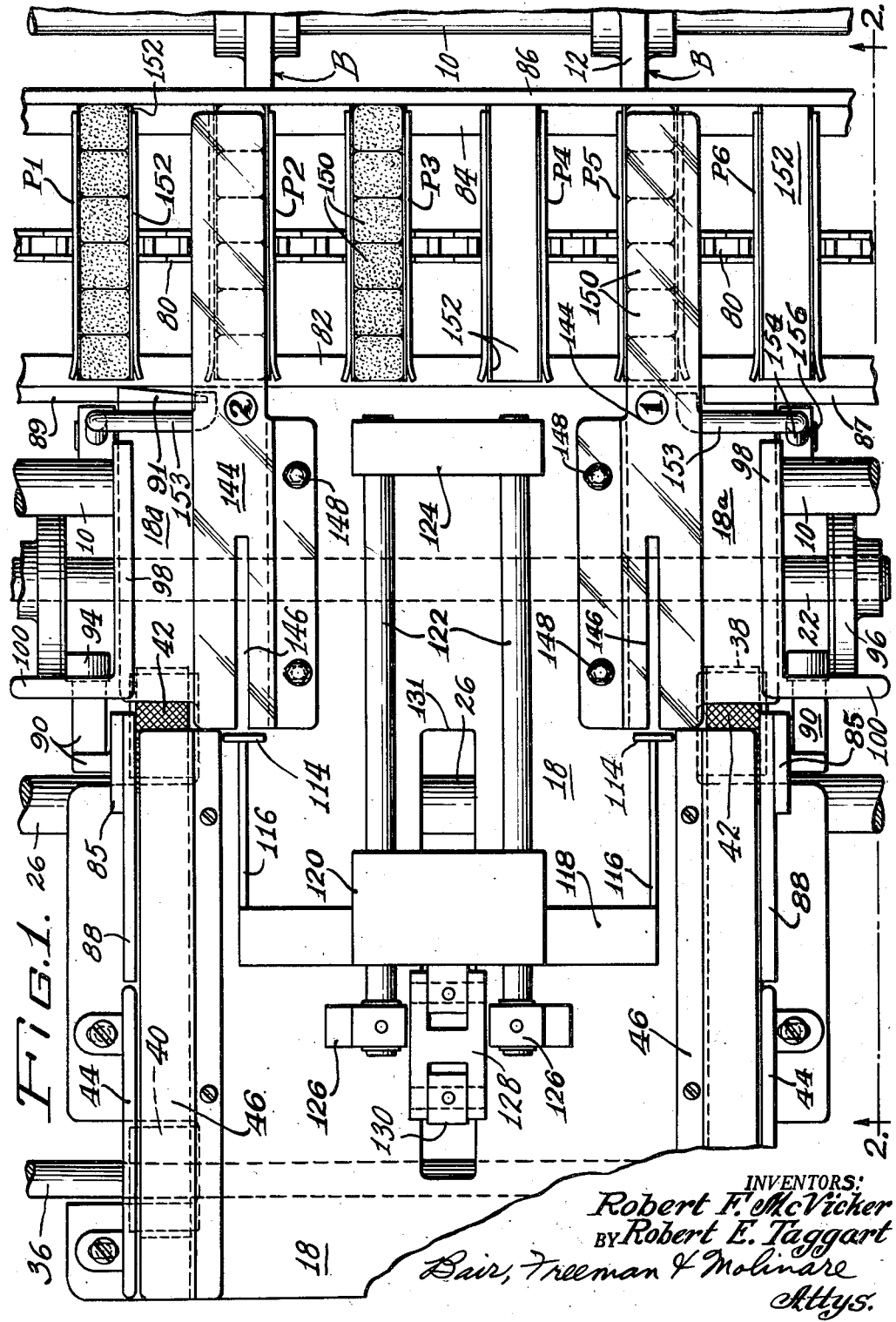

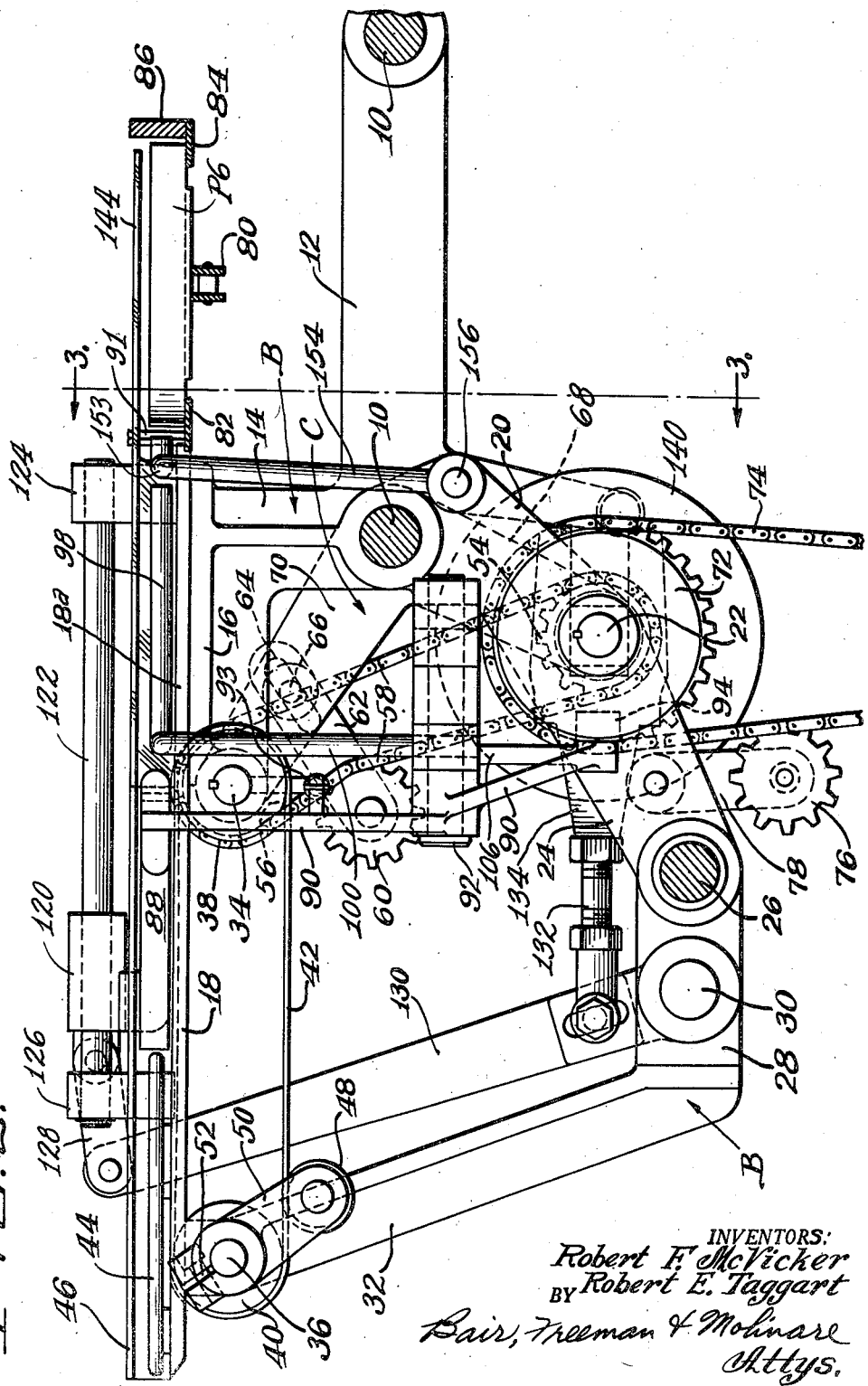

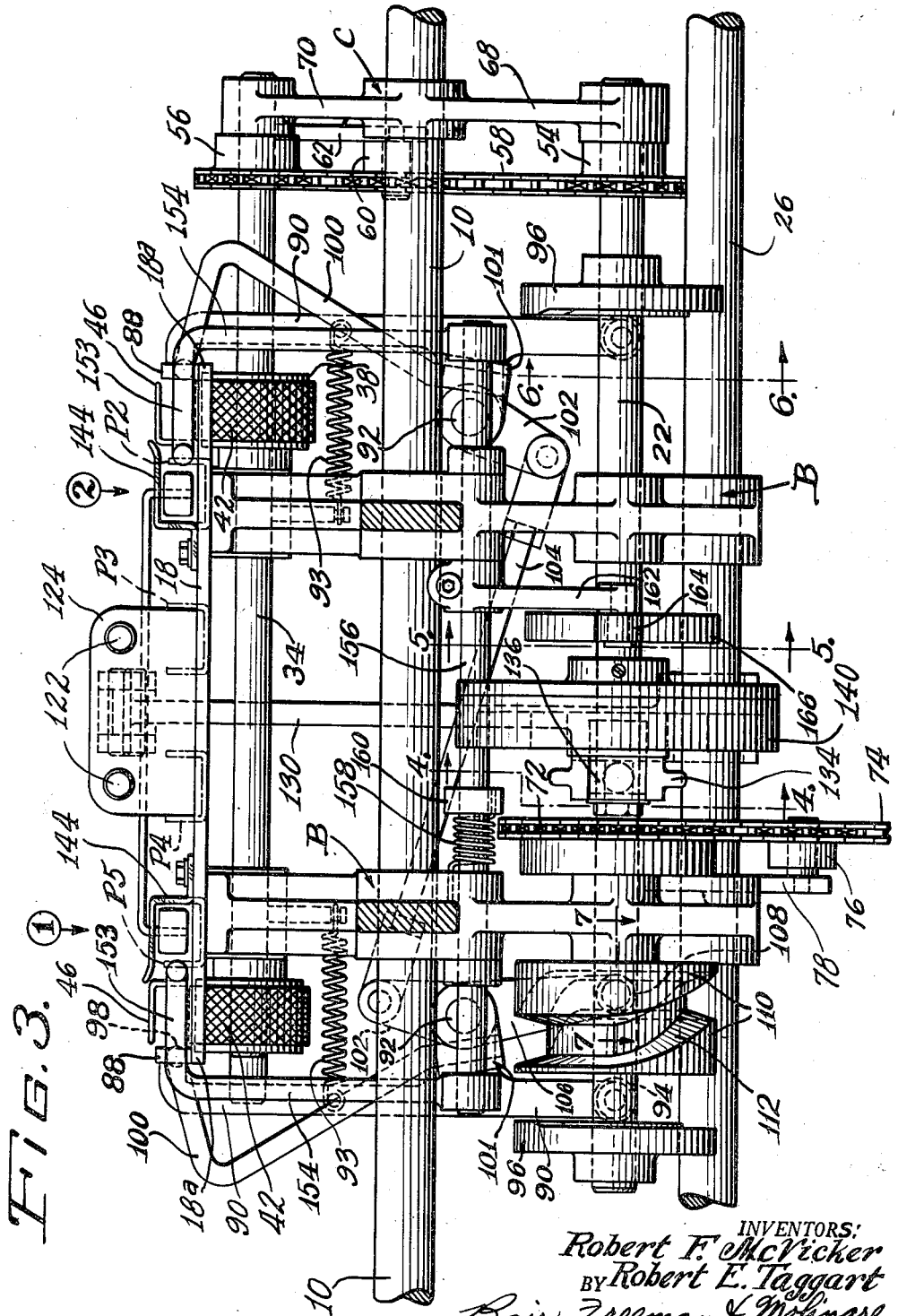

United States Patent Office 2,790,531
Patented Apr. 30, 1957

2,790,531

WRAPPING MACHINE FEEDER

Robert F. McVicker and Robert E. Taggart, Toledo, Ohio, assignors to Lynch Corporation, Anderson, Ind., a corporation of Indiana Application June 29, 1953, Serial No. 364,704

9 Claims. (Cl. 198—30)

This invention relates to feeding mechanism for feeding articles such as a plurality of pieces of candy to a wrapping machine, the plurality of pieces being deposited on a piece of cardboard having its sides bent up to form a "boat" to contain them, and the plurality of pieces as well as the boat being wrapped in a single wrapper.

One object of the invention is to provide a wrapping machine feeder wherein article feeding mechanism of the general character just referred to is provided with two feed conveyors on which small pieces of candy such as caramels may be conveyed in one direction toward a single wrapping machine, the feeder including mechanism for pushing a predetermined number of the pieces of candy laterally with respect to the feed conveyors and then toward a position for being wrapped in a wrapping machine such as one of the type shown in Sandberg Patent No. 2,208,776 of July 23, 1940 or Sandberg Patent No. 2,283,097 of May 12, 1942, the present mechanism being in some respects similar to that shown in Sandberg Patent No. 2,434,772 of January 20, 1948 and being designed to take care of two candy forming machines delivering pieces of candy to a single wrapping machine with dual mechanisms operable from cams on a single drive shaft of our present wrapping machine feeder.

Another object is to provide control mechanism for candy pushers which push two groups of candy laterally toward each other so that they assume a new position where a dual ram can move them again in the original direction of travel and into spaced pockets of a pocket conveyor of the wrapping machine.

Still another object is to provide means to control the pieces of candy delivered from the feed conveyors and consisting of a brake to hold all but a predetermined number thereof, which number engages a stop, after which the stop is moved while the brake is operative in order to loosen up this predetermined number so that they can then be pushed laterally by a pusher into the position required for engagement by a ram that pushes the predetermined number or plurality of candies into a boat located in a pocket of the pocket conveyor.

A further object, in connection with a spacing arrangement of the pockets and an intermittent operation of the pocket conveyor is to provide two rams for the two pluralities of candies to fill alternate pockets of the conveyor with the pluralities of candies, the pocket conveyor being indexed two pockets at a time in order to accomplish the filling of all pockets thereof beyond the second ram.

Still a further object is to provide a cam shaft with cams thereon for operating the brake, pushers and rams, and for coordinating their action with the intermittent motion of the pocket conveyor.

With these and other objects in view, our invention consists in the construction, arrangement and combination of the various parts of our wrapping machine feeder whereby the objects contemplated are attained, as hereinafter more fully set forth, pointed out in our claims and illustrated in the accompanying drawings, wherein:

Figure 1 is a plan view of a wrapping machine feeder embodying our invention.

Figure 2 is a vertical sectional view thereof taken on the line 2—2 of Figure 1.

Figure 3 is a vertical sectional view on the line 3—3 of Figure 2; and

Figures 4, 5, 6, and 7 are vertical sectional views on the lines 4—4, 5—5, 6—6 and 7—7 respectively of Figure 3 to show the ram, brake and stop cams respectively.

On the accompanying drawings we have used the reference numeral 10 to indicate a pair of rigid supporting rods which extend rearwardly from the frame of a wrapping machine as shown in the Sandberg patents above referred to. These rods support a pocket conveyor having pockets as shown in Sandberg Patent No. 2,378,796 of June 19, 1945 to receive a plurality of pieces of candy to be wrapped in a common wrapper.

Our wrapping machine feeder includes a pair of brackets B having arms 12, 14, 16, 20, 24, 28 and 32. These brackets are mounted on the supporting rods 10 as shown in Figures 1, 2, and 3 and are tied together by a tie rod 26. On each bracket B we provide a table 18 adapted to receive caramels and permit of lateral sliding thereof on the table as will hereinafter appear.

A cam shaft 22 is journaled in the brackets B intermediate the arms 20 and 24 and a pivot shaft 30 is mounted in the arms 28 of the brackets. At the left hand end of the arm 16 in Figure 2 a conveyor shaft 34 is journaled, and at the upper end of the arm 32 a conveyor shaft 36 is fixed. A conveyor roller 38 is secured to the shaft 34 and a second roller 40 rotates on the shaft 36. A conveyor belt 42 surrounds the two and constitutes, together with a conveyor side 44 and a conveyor side and top 46, a feed conveyor. Two of these are provided as shown in Figure 1. We provide an idler roller 48 for each conveyor belt 42 carried by an arm 50 which can be clamped at different positions of adjustment on the shaft 36 by means of a clamp screw 52.

For driving the shaft 34 and thereby the feed conveyor belts 42 we provide a sprocket 54 on the cam shaft 22 and a second one 56 on the shaft 34 which are connected together by a chain 58. An idler sprocket 60 is provided for this chain carried by an arm 62 having a slot 64 and clamp screw connection 66 to an arm 70 of a bell crank C having a second arm 68. This bell crank is mounted on one of the supporting rods 10, the cam shaft 22 and the conveyor shaft 34.

The cam shaft 22 is in turn driven by a sprocket 72 secured thereto and a chain 74 extending therefrom to a main shaft (not shown) of the wrapping machine. The speed of rotation of the cam shaft 22 is one-half that of the cyclical rotation of the main shaft of the wrapping machine. An idler sprocket 76 is provided for the chain 74 carried by an arm 78.

The conveyor belts 42 are driven at a somewhat higher speed than required for feeding the proper number of pieces of candy to a pocket conveyor of the wrapping machine so as to always insure a sufficient supply therefor, the belt merely slipping under the pieces of candy when they are halted as will hereinafter be described.

The pocket conveyor above referred to consists of a chain 80 on which are mounted spaced pockets, six of them being shown at P1 to P6 respectively in Figure 1 with their ends supported on bars 82 and 84. A slide bar 86 is provided above the bar 84 and slide bars 87 and 89 are provided above the bar 82. The bar 89 is provided with a tapered portion 91 to properly guide the caramels past the bar 89.

The pocket conveyor 80 is adapted to be advanced one pocket at a time in accordance with the wrapping machine cycles and the Geneva mechanism for doing this is shown in the Sandberg patents above referred to. It forms no part of our present invention and accordingly has not been illustrated.

Each feed conveyor is provided with a brake shoe 88 attached to a foot 85 on an arm 90 pivoted at 92. The lower end of this arm carries a roller 94 coacting with a brake cam 96 under the bias of a spring 93. The two brake cams 96 are secured to the cam shaft 22 for rotation therewith.

Movable across portions 18a of the table 18 are pusher rods 98 which have right angle extensions 100 mounted in fittings 101 also pivoted at 92. The left hand fitting 101 in Figure 2 has an arm 102 extending upwardly therefrom and the right hand fitting has a similar arm 102 depending therefrom. The two arms 102 are connected together for simultaneous operation by a link 104. The left hand fitting 101 also has an arm 106 depending therefrom on the lower end of which is mounted a roller 108 coacting with a groove 112 of a pusher cam 110. The cam 110 is also secured to the cam shaft 22.

For each feed conveyor there is a ram 114 mounted on a thrust bar 116 and the two thrust bars are on opposite ends of a crossbar 118. The crossbar 118 is carried by a slide 120 which is slidable on guide rods 122, the ends of which are mounted in brackets 124 and 126 secured to the table 18.

A link 128 has one end pivoted to the slide 120 and its other end pivoted to the upper end of an arm 130 which in turn has its lower end pivoted on the pivot shaft 30. A link 132 has one end pivoted to the arm 130 and a fork 134 is connected to the other end thereof as shown in Figure 4. This fork is adapted to slide on a slide block 136 journaled on the cam shaft 22 and the fork is provided with a roller 138 coacting with a cam groove 142 of a ram cam 140. The cam 140 is also secured to the cam shaft 22.

Each feed conveyor is provided with a hold-down plate 144 preferably of transparent material and provided with a slot 146 through which the thrust bar 116 can slide. The hold-down plates 144 are secured to the table 18 by means of cap screws 148.

In Figure 1 we have indicated two stations where caramels 150 are loaded into the pockets of the pocket conveyor 80. In each pocket a "boat" 152 comprising a channel shaped cardboard is inserted previously to the pockets coming to the stations referred to which are identified on the drawings as 1 and 2, the numerals being encircled. In the following description we will refer to them as station (1) and station (2).

A stop rod 153 extends across the forward end of each table portion 18a as shown in Figure 1 and is formed on the upper end of a rod-like arm 154. The two arms 154 are secured to a rock shaft 156 which is biased to rotate counterclockwise in Figure 2 and clockwise in Figure 5 by a spring 158 between a collar 160 on the rock shaft 156 and one of the brackets B as shown in Figure 3.

*Practical operation*

In the operation of our wrapping machine feeder, the caramels are continuously fed to the conveyor belts 42 either from caramel forming machines or by hand, and these belts propel the caramels toward the right in Figure 2 onto the portions of the table 18 forming continuations of the belts 42. The first six caramels are pushed across these table portions 18a by the remaining caramels on the belt until they reach the stop rods 153.

The pushers 98 then move toward each other for transferring the six caramels on the table portion 18a to a position in alignment with the rams 114. The brake shoes 88 first move toward each other for clamping all but the first six caramels against further forward movement by the belts 42 which then slip beneath them and the stop rods or stops 152 are then moved forwardly for loosening those six caramels so that the pushers 98 can then operate, after which operation the rams 114 move forwardly (toward the right in Figure 1) for pushing the six caramels at stations (1) and (2) into the pockets P5 and P2. The position of the pockets is shown dotted in Figure 3.

Since the cam shaft 22 rotates at half the cycling of the wrapping machine and the pocket conveyor indexes once each cycle thereof, the previous cycle filled the pocket P3 at station (1) and P1 was filled the cycle before that at station (1). After the position of the parts and caramels as shown in Figure 1 the pocket conveyor will index two cycles and the empty pocket P4 will be filled at station (2) while the pocket P7 (not arrived on the drawing yet) will be filled at station (1). In other words the odd numbered pockets will be filled at station (1) and the even numbered pockets at station (2) so that all are filled and the wrapping machine can continue operating once each cycle to completely wrap a package of the caramels 15 together with one of the boats 152. The machine is provided with electric eye mechanisms as shown in the Sandberg patents to prevent a wrapping operation for any pocket that is not filled with caramels.

The brake shoes 88 are loosened, the pushers 98 are returned and the stops 153 are released to return to the position shown in Figure 1 all at the proper time, due of course to a proper relationship of the circumferential positions of the cams 96, 110, 166, etc. on the cam shaft 22. Two feed conveyors are provided to handle the output from two caramel making machines and by properly coordinating the operations of our feeder with the operations of the wrapping machine, the one wrapping machine can function for caramels from two different sources. Due to the peculiar arrangement of the feeder operating at half the cycling of the wrapping machine and the rams 114 being offset an odd number of pockets from each other, the rams fill all pockets that pass station (2) so as to keep the wrapping machine in continuous operation.

Some changes may be made in the construction and arrangement of the parts of our wrapping machine feeder without departing from the real spirit and purpose of our invention, and it is our intention to cover by our claims any modified forms of structure or use of mechanical equivalents which may be reasonably included within their scope.

We claim as our invention:

1. In a wrapping machine feeder of the character disclosed, a table, a pair of feed conveyors adapted to receive rows of articles to be delivered to said table, said feed conveyors including each a conveyor belt on which the articles are deposited, stops against which articles engage as they are pushed onto said table by said feed conveyors, brake shoes for those articles on said feed conveyors behind predetermined numbers thereof on said table, pushers for pushing said predetermined numbers of articles laterally across said table toward each other to positions spaced from but parallel to said feed conveyors, a common ram at said positions for pushing said predetermined numbers of articles endwise and both in the same direction into spaced pockets of a wrapping machine, means for sequentially applying said brake shoes, moving said stops to loosen said predetermined numbers of articles and moving said pusher to push said predetermined numbers of articles to said positions and in alignment with said common ram, means for thereafter operating said common ram to push the articles from both conveyors longitudinally across said table and into the pockets of the wrapping machine, said pockets being intermittently movable and indexed for one pocket of movement each cycle of operation of the wrapping machine, a pair of stations at which said rams are located, said pair being spaced whereby said ram pushes said pluralities of articles into alternate pockets of said pocket conveyor, and means for operating said brake shoes, stops, pushers and common ram at half the cycling of the wrapping machine.

2. In a wrapping machine feeder of the character disclosed, a table, a pair of feed conveyors adapted to receive rows of articles to be delivered to said table, one of said feed conveyors being aligned with one marginal edge of said table and the other thereof being aligned with the opposite marginal edge thereof said feed conveyors including each a conveyor belt on which the articles are deposited, stops against which articles engage as they are pushed onto said table by said feed conveyors, brake shoes for those articles on the feed conveyor behind predetermined numbers thereof on said table, pushers for pushing said predetermined numbers of articles laterally across said table to positions adjacent each other and adjacent the center of said table between said marginal edges thereof, ram means at said positions for pushing both of said predetermined numbers of articles endwise in the same direction into spaced pockets of a wrapping machine, means for sequentially applying said brake shoes, and moving said pushers to push said predetermined numbers of articles to said positions, means for thereafter operating said ram means to push the articles into the pockets of the wrapping machine, and means for operating said brake shoes, pushers and ram means at half the cycling of the wrapping machine.

3. A wrapping machine feeder comprising, a table, a pair of laterally spaced feed conveyors adapted to receive rows of articles and deliver them to said table, a pusher member for each of said conveyors to push a predetermined number of the articles from each thereof laterally toward each other across said table, a stop against which the predetermined number of articles engages as they are delivered to said table, a brake shoe for the remaining articles on each feed conveyor, a ram for said predetermined numbers of articles to move both pluralities endwise and side-by-side into spaced pockets of a wrapping machine, means for applying said brake shoe, moving said stop to loosen said predetermined number of articles and moving said pusher of each conveyor, means for thereafter operating said ram to push the articles into said spaced pockets, said pockets being intermittently movable each cycle of operation of the wrapping machine, a pair of stations at which said ram is located, said pair of stations being spaced for alignment with alternate pockets of the wrapping machine.

4. A wrapping machine feeder comprising, a table, a pair of laterally spaced feed conveyors adapted to receive rows of articles and deliver them to said table, a pusher member for pushing a predetermind number of the articles from each of said feed conveyors laterally toward each other across said table, a stop against which each predetermined number of articles engages as they are delivered to said table, a brake shoe for the remaining articles on each feed conveyor, ram means for said predetermined numbers of articles to move both thereof endwise into spaced pockets of a wrapping machine, means for applying said brake shoes and moving said pushers to push the articles to positions of alignment with said ram means, means for thereafter operating said ram means to push the articles into the pockets of a pocket conveyor, said pocket conveyor being intermittently movable and indexed for one pocket of movement each cycle of operation of the wrapping machine, a pair of stations at which said ram means is located, said pair of stations being spaced for said ram means to push articles into alternate pockets of said pocket conveyor, and said brake shoes, pushers and ram means being operated at half the cycling of the wrapping machine.

5. In an article feeding mechanism of the character disclosed, a pair of feed conveyors each adapted to receive a row of articles, said feed conveyors each including a conveyor belt on which the articles are deposited, a table onto which the feed conveyors deposit predetermined numbers of the articles, pushers for transferring said predetermined numbers laterally toward each other, brake shoes for engaging the remaining articles on the conveyors for holding them, stops for the articles lengthwise of the table, a pair of rams integrally connected together for moving the articles from the transferred position to the pockets of a pocket conveyor, and a cam shaft for operating said brake shoes, stops, pushers and rams at half the speed of the wrapping machine which wrapping machine operates said pocket conveyor intermittently one pocket at a time, the alignment of said rams with said pockets being such that one ram feeds alternate pockets and the other ram feeds the pockets intermediate said alternate pockets.

6. In an article feeding mechanism, a feed conveyor adapted to receive a row of articles, said feed conveyor including a conveyor belt on which the articles are deposited, a table onto which the feed conveyor deposits a predetermined number of the articles, a pusher for transferring said predetermined number laterally out of alignment with said feed conveyor, a brake shoe for engaging the remaining articles on the conveyor for holding them, a stop for the articles lengthwise of the table, said stop being movable from a stop position in the same direction as said articles move in said conveyor, a ram for moving the articles from the transferred position to a pocket of a pocket conveyor, and means for operating said brake shoe, stop, pusher and ram sequentially for feeding predetermined numbers of said articles to successive pockets of the pocket conveyor.

7. In an article feeding mechanism of the character discolsed, a feed conveyor adapted to receive a row of articles, a table onto which said feed conveyor deposits said articles, a pusher for pushing a predetermined number of said articles laterally across said table to a new position thereon, a brake shoe for engaging the remaining articles on the conveyors for holding them, a stop for foremost article to engage, said stop being movable after engagement in the same direction as articles are moved by said conveyor, a ram for moving the articles from said new position and in the same direction as they were moved by said feed conveyor, and a cam shaft for operating said brake shoe, stop, pusher and ram sequentially.

8. In an article feeding mechanism of the character disclosed, a feed conveyor adapted to receive a row of articles, a table onto which said feed conveyor deposits said articles, a pusher for pushing a predetermined number of said articles laterally across said table to a new position thereon, a brake shoe for engaging the remaining articles on the conveyors for holding them, a stop for the foremost article to engage, said stop being movable from a stop position in the same direction as said articles move in said conveyor, a ram for moving the articles from said new position and in the same direction as they were moved by said feed conveyor, and means for operating said brake shoe, stop, pusher and ram in sequence to respectively hold all but said predetermined number of articles in said conveyor, release said predetermined number of articles, move said predetermined number of articles to said new position and move said predetermined number of articles into a pocket of a pocket conveyor.

9. In an article feeding mechanism of the character disclosed, a feed conveyor adapted to receive a row of articles, a table onto which said feed conveyor deposits said articles, a pusher for pushing a predetermined number of said articles laterally across said table to a new position thereon, a brake shoe for engaging the foremost of the remaining articles on the conveyors for holding them, a stop for the foremost article of said predetermined number of articles to engage, said stop being movable after engagement in the same direction as articles are moved by said conveyor, a ram for moving the articles from said new position and in the same direction as they were moved by said feed conveyor, and means for operating said brake shoe, stop, pusher and ram in sequence to respectively hold all but said predetermined number of articles in said conveyor, release said predetermined number of articles, move said predetermined number of articles to said new position and move said predetermined number of articles into a pocket of a pocket conveyor, said means being in timed relation with intermittent movement of the pocket conveyor.

References Cited in the file of this patent

UNITED STATES PATENTS

| | | |
|---|---|---|
| 2,335,750 | Fincke | Nov. 30, 1943 |
| 2,378,796 | Sandberg | June 19, 1945 |
| 2,587,959 | Biner | Mar. 4, 1952 |
| 2,603,340 | Warren | July 15, 1952 |
| 2,636,592 | Socke | Apr. 28, 1953 |
| 2,641,371 | Webster | June 9, 1953 |